(12) United States Patent
Iacona

(10) Patent No.: US 6,827,152 B2
(45) Date of Patent: Dec. 7, 2004

(54) ROTARY HEAD FOR A DETHATCHING MACHINE

(75) Inventor: Fernando R. Iacona, Scottsdale, AZ (US)

(73) Assignee: Kwik Products, Inc., Scottsdale, AZ (US)

(*) Notice: Subject to any disclaimer, the term of this patent is extended or adjusted under 35 U.S.C. 154(b) by 34 days.

(21) Appl. No.: 10/354,291

(22) Filed: Jan. 29, 2003

(65) Prior Publication Data
US 2003/0155137 A1 Aug. 21, 2003

Related U.S. Application Data
(60) Provisional application No. 60/360,028, filed on Feb. 21, 2002.

(51) Int. Cl.$^7$ ............................................... A01B 33/00
(52) U.S. Cl. ........................... 172/42; 56/12.7; 56/12.5; 56/16.7
(58) Field of Search ............................... 56/12.7, 16.7, 56/12.4, 12.5; 172/42, 45, 48, 49

(56) References Cited

U.S. PATENT DOCUMENTS

| | | | |
|---|---|---|---|
| 4,062,114 A | * 12/1977 | Luick | 30/276 |
| 4,112,653 A | * 9/1978 | Ballas et al. | 56/12.7 |
| 4,118,865 A | * 10/1978 | Jacyno et al. | 30/276 |
| 4,126,990 A | 11/1978 | Fisher et al. | |
| 4,155,315 A | * 5/1979 | Dobbins | 111/8 |
| 4,461,138 A | * 7/1984 | Whitman | 56/12.7 |
| 4,541,230 A | * 9/1985 | Huerter | 56/193 |
| 4,802,536 A | * 2/1989 | O'Neal | 172/42 |
| 5,142,852 A | * 9/1992 | Nelson | 56/16.6 |
| 5,524,425 A | 6/1996 | Gallazzini | |
| 5,546,739 A | * 8/1996 | Hettich | 56/367 |
| 5,577,374 A | 11/1996 | Huston | |
| 5,791,054 A | 8/1998 | Bessinger | |
| 5,911,671 A | * 6/1999 | Heitstuman | 56/16.4 R |
| 6,158,202 A | 12/2000 | Jung | |
| 6,237,695 B1 | * 5/2001 | Pierce et al. | 172/79 |
| 6,357,214 B1 | * 3/2002 | Iacona | 56/12.7 |

* cited by examiner

Primary Examiner—Victor Batson
(74) Attorney, Agent, or Firm—Anthony J. Casella; Gerald E. Hespos

(57) ABSTRACT

A rotary head for dethatching machine includes a plurality of channels which are evenly distributed along the outer periphery of the rotary head for receiving flexible dethatching filaments. The dethatching filaments are elongated with a plurality of barb-like protrusions on one end thereof for engagement in the channels of the housings. Once a filament is inserted into a channel, it cannot be pulled out due to the protrusions engaging the interior and exterior walls of the channel of the rotary head. A plurality of rotary heads are mounted on a shaft of a machine. During rotation of the shaft and the rotary heads, the flexible filaments contact the accumulated dethatch with sufficient force to dislodge thatch for later retrieval and clean up.

10 Claims, 6 Drawing Sheets

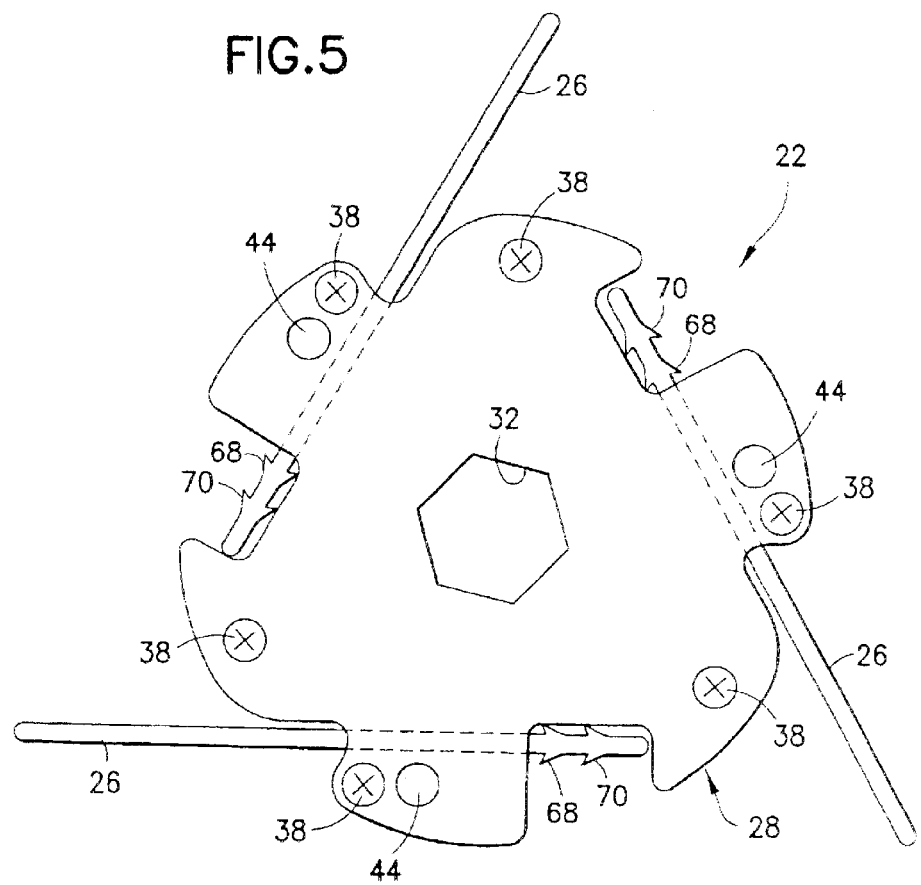
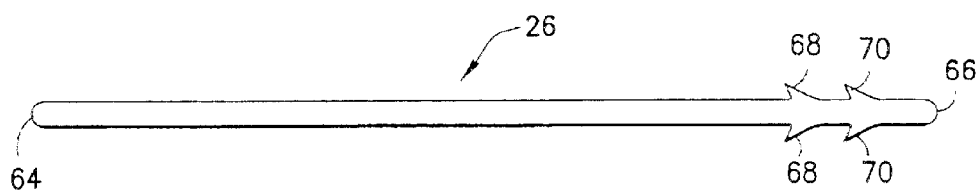

US 6,827,152 B2

ROTARY HEAD FOR A DETHATCHING MACHINE

This application claims priority on U.S. Provisional Appl. No. 60/360,028, filed Feb. 21, 2002.

BACKGROUND OF THE INVENTION

1. Field of the Invention

The subject invention relates to lawn care equipment, and more particularly to a new and improved rotary head for use in a dethatching machine. Furthermore, the subject invention relates to a rotary head with replaceable filaments that is low cost, easy to manufacture, easy to maintain, and extremely sturdy in construction.

2. Description of the Related Art

Thatch is a mat of undecomposed plant material, consisting primarily of grass clippings accumulated next to the soil in a lawn. Excessive thatch is undesirable, since it chokes the roots of the grass, restricts exposure of the soil to the atmosphere, and causes run-off of water away from the soil. Presently, thatch is removed by raking and collecting the accumulated material. However, thatch is generally embedded in a lawn and it requires a time-consuming effort to remove. Gasoline powered dethatchers are known in the art and ease the dethatching process. These dethatchers suffer from several drawbacks. First, the dethatchers are primarily built for the professional landscaper rather than the average homeowner. Thus, these machines are designed and built to professional standards, having size, power, and a price tag not suitable for the homeowner. Whereas the professional landscaper will use this dethatcher on a regular basis, the homeowner, who may use it once or twice a year, cannot justify the high expense of such a machine. Secondly, the prior art dethatchers employ a completely metallic structure for extracting the thatch from a lawn. In particular, metallic claws or coils extend from a cylindrical, rotating housing, which are systematically passed into the grass to loosen and dislodge the thatch. Loosened thatch is collected either by raking, blowing or vacuuming and then properly disposed of. Also, loosened thatch may be mulched by passing over the loosened thatch with a mulching mower thereby reducing the need for fertilizers or valuable space in the waste stream. Unfortunately, the claws and coils are often damaged by hidden rocks, roots, or other debris, or tangled up with the thatch material thereby reducing the effectiveness of thatch removal. As such, the claws and coils must be removed and either replaced with substitute parts or cleaned. Such removal, however, requires a special tool and a time consuming effort.

An improvement to prior art dethatchers is disclosed in U.S. Pat. No. 6,357,214 which was invented by the applicant of the subject invention. U.S. Pat. No. 6,357,214 is incorporated herein by reference. In applicant's U.S. Pat. No. 6,357,214 an improved dethatching machine is disclosed that incorporates a plurality of rotating heads having a number of flexible filaments for dethatching a lawn. Since the number of heads was adjustable depending on the scope of the job, it is suitable for use by homeowners in a small electric powered model, while a larger gasoline powered version is suitable for the professional landscaper. Although this device is an improvement over the prior art, the present application is a further improvement on that device.

Therefore, it is an objective of the subject invention to provide a rotary head for a dethatching machine that is simple and inexpensive to manufacture, and does not include moving parts to hold the dethating claws.

A further objective of the subject invention is to provide a rotary head with easy to replace components.

Another objective of the subject invention is to provide a rotary head that is capable of being used with a plurality of like rotary heads in a variety of configurations.

Yet, another objective of the subject invention is to provide a rotary head for use on both professional and homeowner dethatching machines.

SUMMARY OF THE INVENTION

A housing containing a plurality of flexible filaments is disposed on a rotating shaft for removing thatch from a grassy surface. The rotating shaft is part of a motorized dethatching machine. The housing is used in conjunction with a plurality of like constructed housings as an integral part of a dethatching machine. The housings have a fixed orientation with respect to each other and this orientation is user adjustable to correspond to the requirements of the job at hand.

The housing of the rotary head has a plurality of channels, evenly distributed along the outer perimeter for receiving the flexible dethatching filaments. The dethatching filaments are elongated with a plurality of barb-like protrusions on one end for engagement in the channels of the housings. Once a filament is inserted into a channel, it cannot be pulled out due to the protrusions engaging the interior and exterior walls of the channel. This maintains each filament in the proper position while the head is rotating. During rotation of the head, the flexible filaments contact the accumulated thatch with sufficient force to loosen and dislodge the thatch for later retrieval and clean up. A damaged filament is readily replaced by inserting a new filament into the channel, thereby dislodging the broken or damaged filament, and fixing the new filament in position.

BRIEF DESCRIPTION OF THE DRAWINGS

FIG. 5 is a plan view of a rotary head of the subject invention;

FIG. 10 is a top plan view of a flexible filament used in the rotary head of the subject invention.

DETAILED DESCRIPTION OF THE PREFERRED EMBODIMENT

Figure 1:
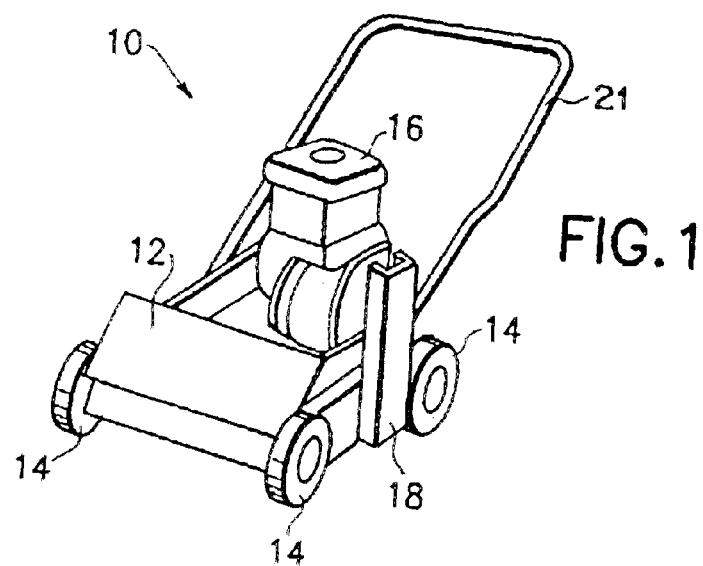
FIG. 1 is a perspective view of a dethatching machine with a plurality of rotary heads of the subject invention.
Figure 2:
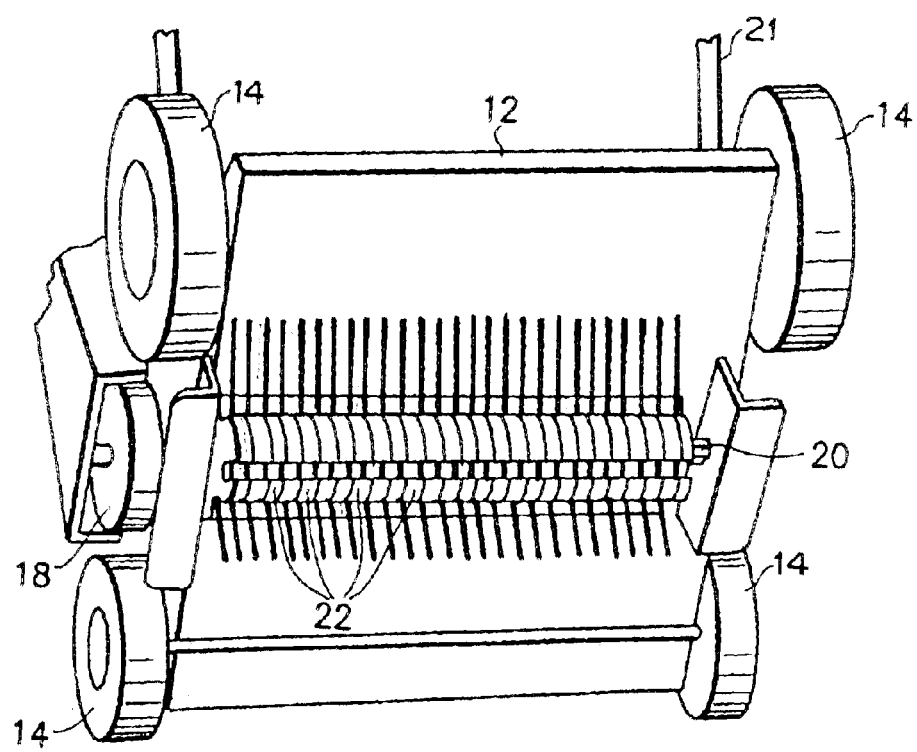
FIG. 2 is perspective view of the bottom of the dethatching machine illustrating the stacked array of rotary heads of the subject invention.

Turning to FIGS. 1 and 2, the dethatching machine of the subject invention is generally designated by the numeral 10 and includes a carriage assembly 12 mounted on four corner wheels 14, a motor 16 connected to a drive train mechanism 18 which extends to drive shaft 20 on which a plurality of rotary heads 22 of the subject invention are mounted. A handle 21 is provided to enable the operator to direct the movement of the dethatching machine 10.

Figure 3:
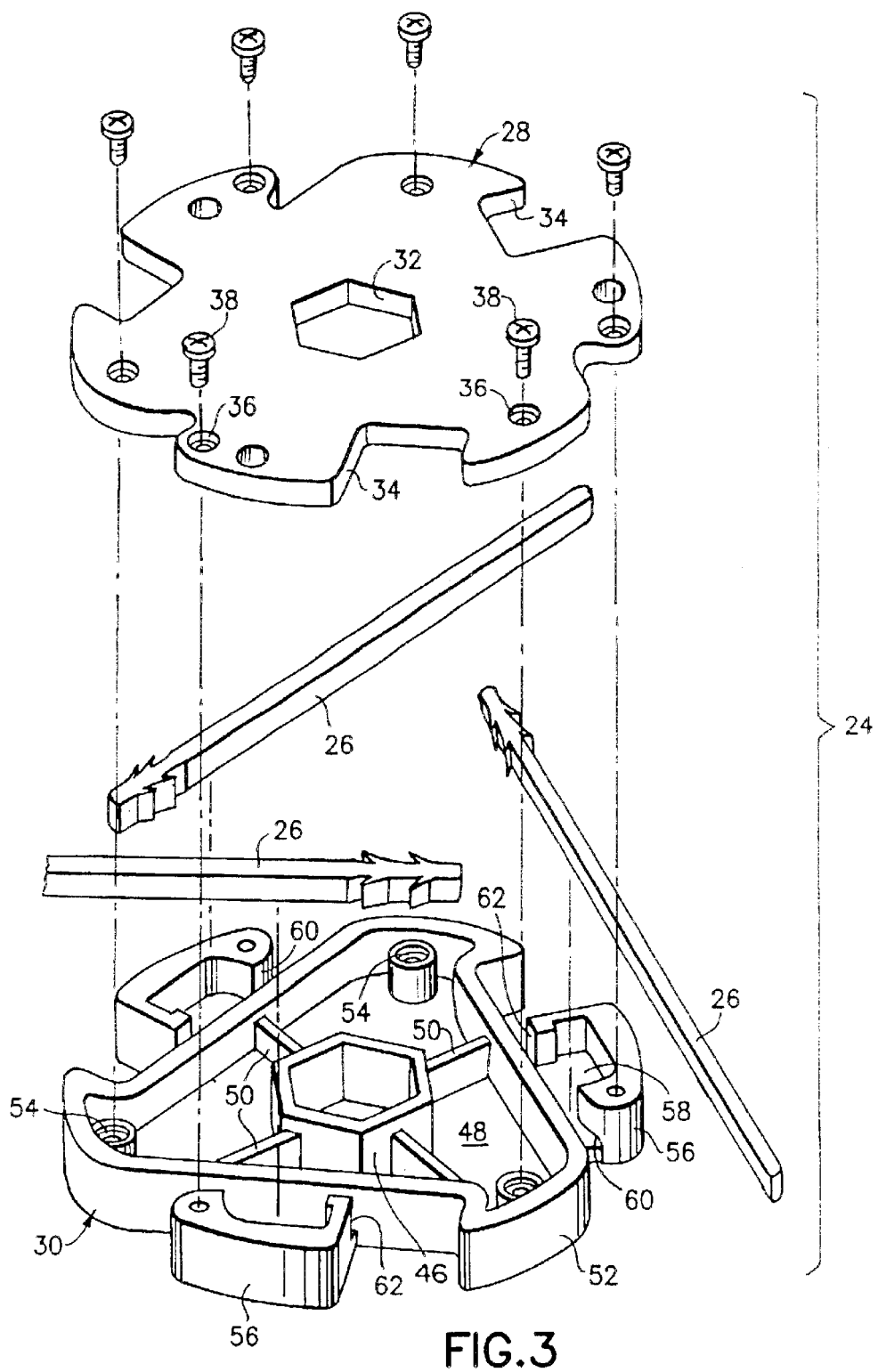
FIG. 3 is an exploded perspective view of the components of the subject rotary head.

The motor 16 may be either a gasoline driven motor or electrically powered motor, and the drive shaft 20 extends generally horizontal, parallel to the ground, and is preferably hexagonal in cross section for cooperative engagement with the plurality of rotary heads 22. As shown in FIG. 3, each rotary head 22 generally comprises a housing 24 from which extend a plurality of flexible filaments 26. As shown in FIG. 2, the flexible filaments 26 of the plurality of rotary heads 22 are in radial and axial alignment. Alternatively, the rotary heads 22 may be mounted on shaft 20 such that the flexible filaments 26 are in a staggered relationship at 60° angles, as compared to the 120° radial increments as shown in FIG. 2.

Referring to FIG. 3, a rotary head 22 is shown as including housing 24 formed by a cover 28 and a channel wall portion 30, with the housing 24 being configured to retain and hold a plurality of flexible filament 26, as described in detail below.

Figure 8:
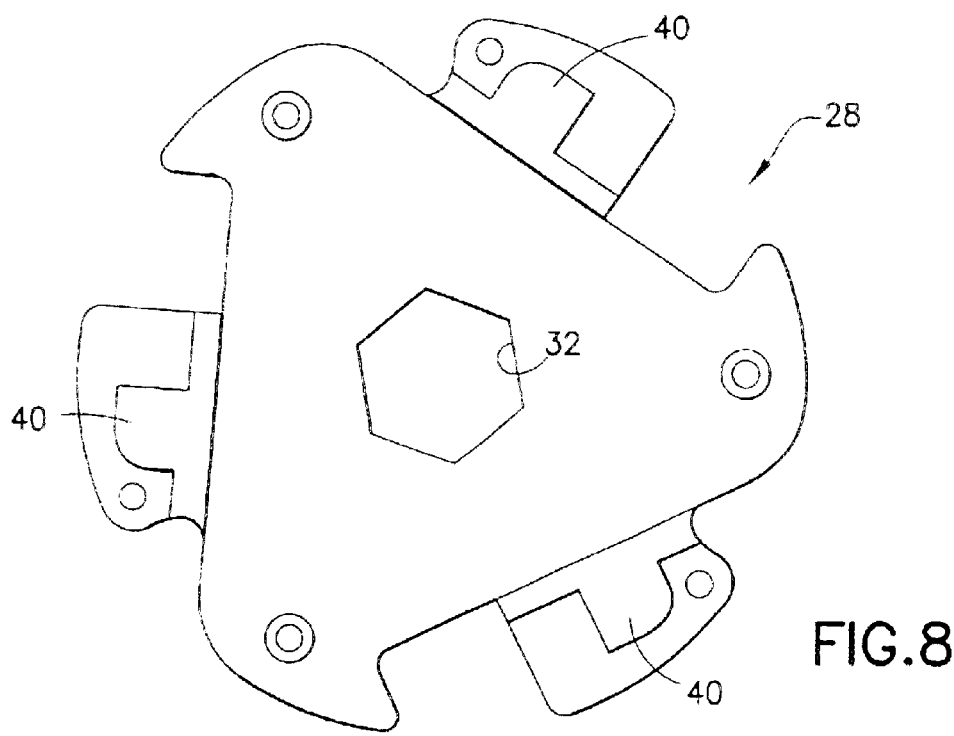
FIG. 8 illustrates the interior surface of the cover of the housing.
Figure 9:
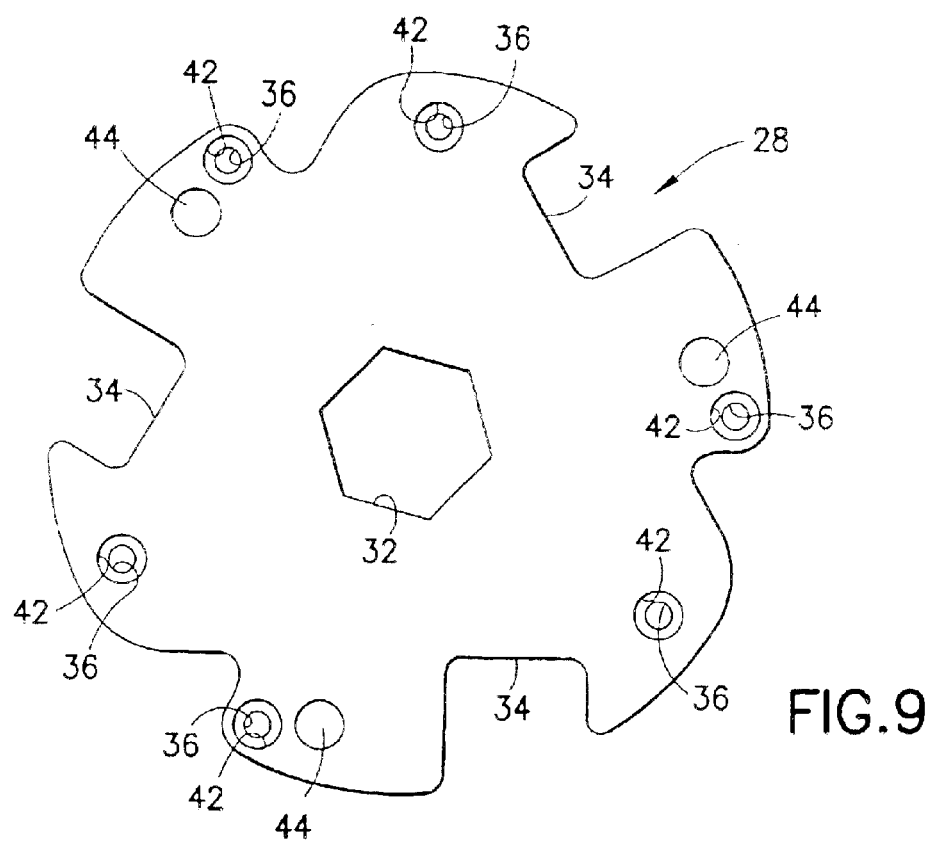
FIG. 9 illustrates the opposite side of the cover of the housing as shown in FIG. 8.

The cover 28 of each rotary head 22 is illustrated in FIGS. 3, 8 and 9, and basically comprises a planar surface having a central opening 32 of hexagonal configuration corresponding to the hexagonal cross section of the drive shaft 20. Disposed along the periphery of the cover 28 are a plurality of cut outs 34 and spaced holes 36 to allow the passage therethrough of screws 38 which secure the cover 28 to the channel wall portion 30. FIG. 8 illustrates the interior surface of the cover 28 and includes a plurality of protrusions 40 which extend above the surface of the cover and are designed to extend into the channel wall portion 30 to aid in securing the position of the flexible filaments 26 in the rotary head 22. The external surface of the cover 28 is shown in FIG. 9 and it is noted that the holes 36 includes recessed portions 42 to accommodate the heads of the screws 38 so that the screw are flush with the outside surface of the coverage 28. As shown in FIG. 9, spaced opening 44 extend partially through the cover 28.

Figure 4:
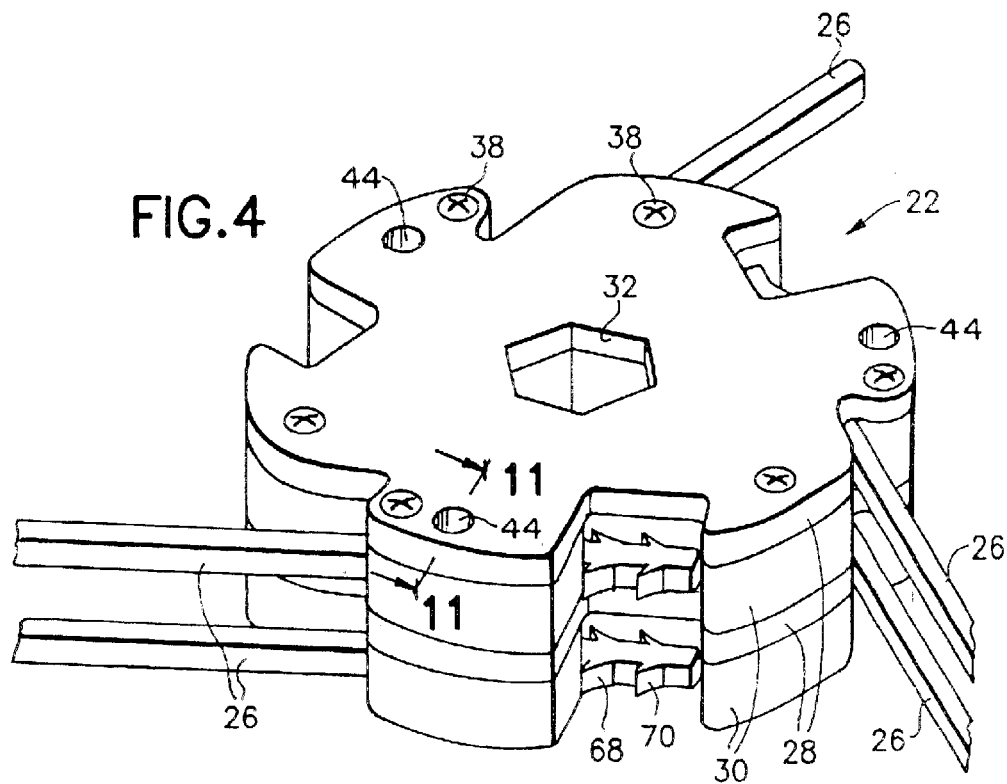
FIG. 4 is a perspective view of a plurality of rotary heads of the subject invention in stacked relationship.
Figure 11:
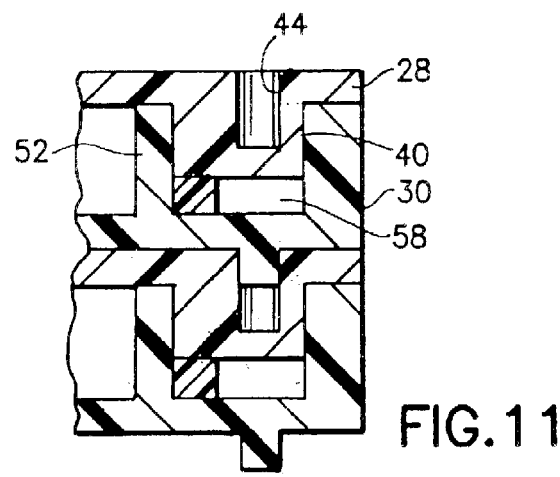
FIG. 11 is a cross-sectional view taken along line 11—11 in FIG. 4.
Figure 6:
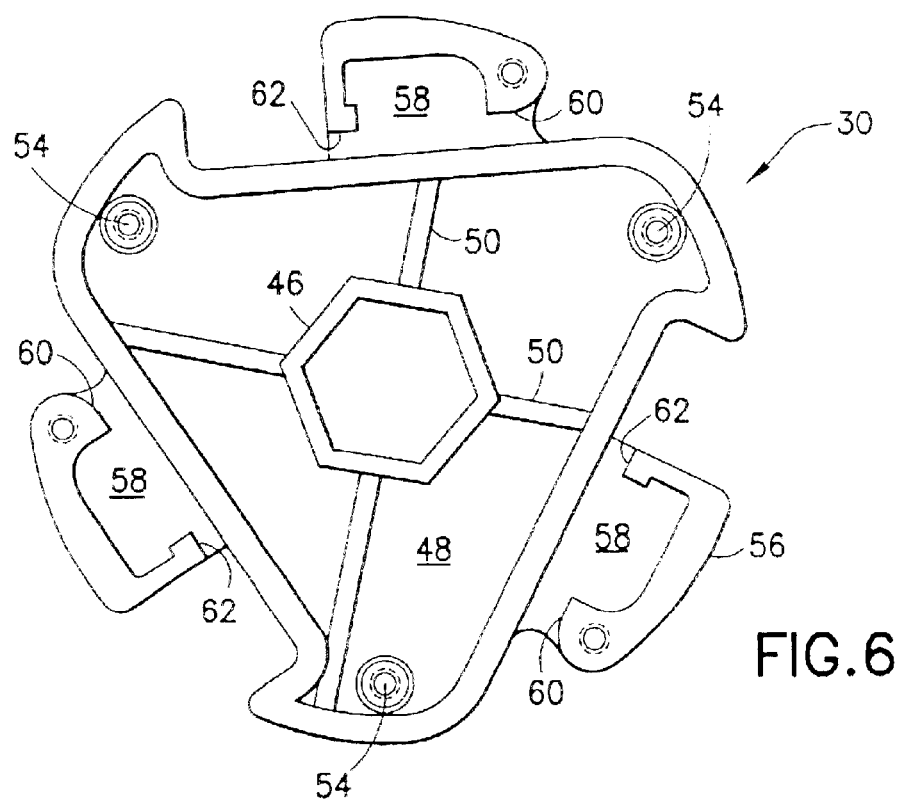
FIG. 6 is a plan view of the interior of the channel wall portion of the housing of the subject rotary head.
Figure 7:
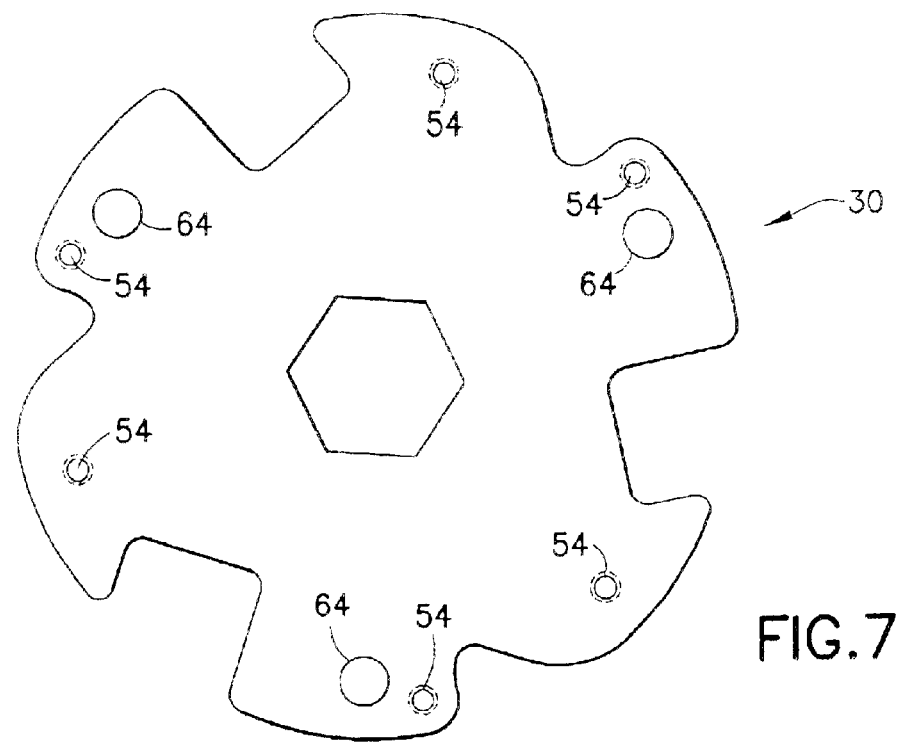
FIG. 7 is a plan view of the cover of the outer surface of the channel wall portion.

Referring to FIGS. 3, 6 and 7, the channel wall portion 30 of the housing 24 also includes a central hub 46 of hexagonal configuration for receiving the hexagonal drive shaft 20. The channel wall portion 30 includes a base 48 along with radially extending, support spines 50 which extend to a peripheral wall 52. Disposed within the peripheral wall 52 are a plurality of threaded receptacles 54 for threadly engaging the screws 38 when the cover 28 is secured to the channel wall portion 30. As shown in FIGS. 3 and 6, disposed radially outwardly of the peripheral wall 52 are three cantilevered flanges 56, each of which defines a cavity 58 which is adapted to receive a protrusion 40 of the cover 28 to thereby define a restricted entrance opening 60 and a restricted outlet 62 for receiving and retaining a flexible filament 26. Extending from the external surface of the channel wall portion 30 are spaced annular projections 64 which are adapted to engage the opening 44 in the cover of an adjacent rotary head housing when the rotary heads are in stacked relationships as shown in FIG. 2. As shown in FIG. 4 and the cross-sectional view of FIG. 11, each depending protrusion 40 of the cover 28 extends into a cavity 58 to create the restricted area for passage therethrough of a flexible filament 26.

Turning to FIG. 10, the flexible filament 26 is of elongated, generally square cross sectional configuration, and is preferably made of nylon, although other suitable flexible plastic materials may be used in the manufacture of the flexible filament 26. Alternatively, the cross sectional configuration of the flexible filament 26 may be rectangular, circular or other cross sectional configuration. The end 66 of the flexible filament which is designed to engage the grass surface is generally rounded, while the opposite end 68 is also rounded and includes at least one set of barbs 70, 70. As shown in FIG. 10, two sets of spaced barbs 70, 72 may be provided. It should be made clear that only one set of barbs are required but for additional safety, two sets of barbs may be provided as depicted in the embodiment illustrated in FIG. 10.

In the assembly of the rotary head 22, the cover 28 is secured to the channel 30 by means of screws 38, after which the flexible filaments 26 are installed in the rotary head 22. This is done by inserting the rounded end 68 adjacent the barbs 70, 72 of a filament 26 through the restricted entry 60 of the cantilevered flange 56, until such time as the barbs 70, 72 extend completely through the flange 56 and past the restricted outlet 62, as shown in FIGS. 4 and 5.

Since the barbs 70, 72 are extensible, the flexible filament 26 may be inserted through the restricted inlet 60 and past the restricted outlet 62, even thought such inlet and outlet are smaller in cross section than the relaxed position of the barbs. After the barbs exit the restricted outlet 62 they extend fully outward, as shown in FIGS. 4 and 5, and thus the flexible filament is restrained from being pulled out of the rotary head during operation of the dethatching machine. The filaments 26 are of sufficient length to make proper contact with thatch.

The barbs 70, 72 act to prevent the flexible filament 26 from being pulled out of the rotary head. Any rearward movement of the flexible filament 26 would cause the ends of the barbs to engage the peripheral wall 52 and prevent further rearward motion. If a filament is broken during operation, replacement is a simple procedure. The broken filament 26 is grabbed by the tip 68 and pulled at an angle away from the peripheral wall 52 of the channel wall portion 30 such that the filament tip 68 is forced past the peripheral wall 52 at an angle thereby allowing the broken filament 26 to be replaced. Following removal, a new flexible filament 26 is inserted into the rotary head 22 through the restricted opening 60 and the restricted outlet 62, and the user may then continue the dethatching operation. Replacement of a flexible filament 26 does not require complex tools or removal of the cover 28 from the channel wall portion 30 of the housing 24.

As shown in FIG. 4, the housings 24 are stack in abutting relationship, with the hexagonal central hubs being aligned so as to be readily mounted on the hexagonal drive shaft 20 of the dethatching machine 10.

As is readily apparent, numerous modifications and changes may readily occur to those skilled in the art, and hence it is not desired to limit the invention to the exact construction and operation shown and described, and accordingly all suitable modification equivalents may be resorted to as following within the scope of the invention as claimed.

What is claimed is:

1. A rotary head for a grass dethatching machine comprising:
   a housing which is generally planar with a generally circular annular shape and having a plurality of channels distributed about the perimeter of the housing, each said channel having a restricted opening, said housing having a central opening for engaging the drive shaft of the grass dethatching machine; and a corresponding plurality of elongated flexible filaments, each flexible filament having a plurality of barb-like protrusions at one end thereof, which barb-like protrusions extend through said restricted openings for engagement in a channel of the housing, said elongated flexible filaments extending generally tangential to the annular perimeter of the housing.

2. A rotary head as in claim 1, wherein the housing comprises a cover and a channel wall portion which are secured together to define said channels.

3. A rotary head as in claim 1, wherein the central opening of the housing is generally is hexagonal in configuration.

4. A rotary head as in claim 1, wherein each elongated flexible filament is generally square in cross-section, with the barb-like protrusions extending from opposite sides of two of the four walls of the flexible filament.

5. A rotary head as in claim 1, wherein the elongated flexible filaments are made of nylon material.

6. A grass dethatcher comprising;

a frame assembly including wheels and having a generally horizontally extending rotary shaft;

a plurality of rotary heads fixedly secure to said shaft for rotation therewith, each said rotary head including a housing having a plurality of channels distributed over the perimeter of the housing, each said channel having a restricted opening, said rotary head further including a corresponding plurality of elongated flexible filaments, each flexible filament having a plurality of barb-like protrusions at one end thereof, said barb-like protrusions extending through said restricted opening for engagement in a channel of the housing said flexible filaments extending radially outwardly from said housing and being disposed generally perpendicular to the horizontal axis of said rotary shaft during operation of said grass dethatcher; and drive means secured to the frame assembly and operatively connected to said rotatable shaft whereby, during operation of said drive means, the flexible filaments are rotated above the horizontal shaft and extend a sufficient distance for the dethatching of a lawn.

7. A grass dethatcher as in claim 6, wherein said means for rotating said shaft comprises a gasoline powered motor mounted on said frame assembly and operatively connected to said rotatable shaft.

8. A grass dethatcher as in claim 6, wherein said means for rotating said rotatable shaft is an electrical motor mounted on said frame.

9. A grass dethatcher as in claim 6, wherein said flexible filaments are made of nylon material.

10. A grass dethatcher as in claim 6, wherein each elongated flexible filament is generally square in cross-section, with the barb-like protrusions extending from opposite sides of two of the four walls of the flexible filament.

* * * * *